United States Patent
Lee et al.

(10) Patent No.: US 8,652,626 B2
(45) Date of Patent: Feb. 18, 2014

(54) BIAXIALLY ORIENTED METALLIZED POLYLACTIC ACID FILM WITH HIGH METAL ADHESION AND HIGH BARRIER PROPERTIES

(75) Inventors: Mark S. Lee, North Kingstown, RI (US); Claudio M. Paulino, South Kingstown, RI (US); Takeshi Mizumura, East Greenwich, RI (US); Keunsuk P. Chang, North Kingstown, RI (US); Nao Yokota, Saunderstown, RI (US); Jun'ichi Masuda, Shiga (JP)

(73) Assignees: Toray Plastics (America), Inc., N. Kingstown, RI (US); Toray Industries, Inc., Otsu, Shiga (JP)

( * ) Notice: Subject to any disclaimer, the term of this patent is extended or adjusted under 35 U.S.C. 154(b) by 729 days.

(21) Appl. No.: 12/731,925

(22) Filed: Mar. 25, 2010

(65) Prior Publication Data

US 2010/0247886 A1    Sep. 30, 2010

Related U.S. Application Data (60) Provisional application No. 61/164,177, filed on Mar. 27, 2009.

(51) Int. Cl.
*B32B 27/32* (2006.01)
*B32B 15/04* (2006.01)
*B32B 7/02* (2006.01)
*B32B 15/08* (2006.01)
*B32B 3/00* (2006.01)

(52) U.S. Cl.
USPC ........... 428/220; 428/347; 428/480; 428/336; 428/346; 428/216; 428/458; 428/156

(58) Field of Classification Search
None
See application file for complete search history.

(56) References Cited

U.S. PATENT DOCUMENTS

| | | | |
|---|---|---|---|
| 6,153,276 A | 11/2000 | Oya et al. | |
| 6,600,008 B1 | 7/2003 | Kobayashi et al. | |
| 6,713,175 B1 | 3/2004 | Terada et al. | |
| 7,368,160 B2 | 5/2008 | Inglis | |
| 7,390,558 B2 | 6/2008 | Aritake et al. | |
| 8,252,421 B2 * | 8/2012 | Arai et al. | 428/423.1 |
| 2005/0287358 A1 * | 12/2005 | Inglis | 428/328 |
| 2006/0068200 A1 * | 3/2006 | Cleckner et al. | 428/347 |
| 2009/0148715 A1 * | 6/2009 | Lee | 428/480 |
| 2010/0040904 A1 * | 2/2010 | Cloutier et al. | 428/626 |

FOREIGN PATENT DOCUMENTS

| | | |
|---|---|---|
| JP | 2004-358721 | 12/2004 |
| WO | WO-2008/020726 | 2/2008 |

\* cited by examiner

*Primary Examiner* — David Sample
*Assistant Examiner* — Nicole T Gugliotta
(74) *Attorney, Agent, or Firm* — Morrison & Foerster LLP (57) ABSTRACT

Metallized multi-layer biaxially oriented polylactic acid base polymer (BOPLA) films that exhibits improved barrier properties and metal adhesion. The films include a core layer including crystalline polylactic acid base polymer, a first skin layer consisting essentially of amorphous polylactic acid base polymer, and a metal layer on the first skin layer. The films may include a second skin layer consisting essentially of amorphous polylactic acid base polymer.

20 Claims, 1 Drawing Sheet

BIAXIALLY ORIENTED METALLIZED POLYLACTIC ACID FILM WITH HIGH METAL ADHESION AND HIGH BARRIER PROPERTIES

CROSS-REFERENCE TO RELATED APPLICATION

This application claims the benefit of U.S. Provisional Application No. 61/164,177, filed on Mar. 27, 2009, the entirety of which is incorporated herein by reference.

JOINT RESEARCH AGREEMENT

The presently claimed invention was made by, or on behalf of, the below listed parties to a joint research agreement. The joint research agreement was in effect on or before the date the claimed invention was made, and the claimed invention was made as a result of activities undertaken within the scope of the joint research agreement. The parties to the joint research agreement are: 1) Toray Plastics (America), Inc. and 2) Toray Industries, Inc.

FIELD OF THE INVENTION

This relates to a metallized multi-layer biaxially oriented polylactic acid base polymer (BOPLA) film with a novel metallization formulation which exhibits improved barrier properties and metal adhesion.

BACKGROUND OF THE INVENTION

Biaxially oriented films made from conventional petrochemical-based polymers, such as biaxially oriented polypropylene (BOPP) films and biaxially oriented polyethylene terephthalate (BOPET) films have been used for packaging, decoration, and label applications, and often perform multiple functions. For example, in lamination they may provide printability, transparent or matte appearance, or slip properties; they may provide a surface suitable for receiving organic or inorganic coatings for gas and moisture barrier properties; and they may provide a heat sealable layer for bag forming and sealing, or a layer that is suitable for receiving an adhesive either by coating or laminating.

In recent years, interest in "greener" packaging has been developing. Packaging materials based on biologically derived polymers are increasing due to concerns with renewable resources, raw materials, and greenhouse gases. Bio-based polymers are believed—once fully scaled-up—to help reduce reliance on petroleum, reduce production of greenhouse gases, and may be biodegradable as well. Bio-based polymers such as polylactic acid—which is derived from corn starch and thus, can be considered to be derived from a renewable resource—is one of the more popular and commercially available materials for packaging film applications.

For bio-based polymer films to be fit-for-use for many packaging applications such as snack foods, it is desirable that the bio-based polymer films match as many of the attributes possible of films made from BOPP and BOPET, which are well-known for heat sealability, printability, controlled COF, metallizability, gas barrier properties, for example. However, biaxially oriented polylactic acid base polymer (BOPLA) films can suffer from poorer thermal stability, poorer moisture barrier properties, and weaker metal adhesion properties than current petroleum-based packaging films. To address some of these deficiencies, one could use petrochemical or non-biodegradable base components to compensate for the disadvantages of BOPLA films in the packaging laminate structure. For example, one could use polyethylene or polypropylene-based materials to apply heat sealability and high gas barrier properties to the packaging laminate structure by laminating them to a simple BOPLA outer film where the BOPLA film provides a printable surface but not the sealability or barrier.

However, recently the desire for "greener" packaging is requiring 100% compostable, bio-degradable or renewable design in the packaging film. In this configuration, the component using BOPLA film is expected to provide desirable performances without relying on the conventional petrochemical-based resins or films. Therefore, BOPLA films are required to be more functionalized in order to provide a cost-effective package that allows for viable commercial success. The single sheet of BOPLA film needs to have multiple functionalities, such as high gas barrier and heat sealability. A particular concern for high barrier packaging is the poor moisture barrier property of BOPLA. The polar nature of PLA tends to be detrimental for achieving high moisture barrier properties. Without being bound by any theory, the thought is that water molecules—being polar themselves—may more easily migrate through a polar polymer film than a non-polar polymer film. In addition, plain crystalline BOPLA film presents difficulties in the down-stream conversion processes such as heat sealing, bag-forming etc, due to its high surface crystallinity resulting from the biaxial orientation process as well as due to the poor impact resistance, poor heat resistance, and poor formability of PLA polymer itself.

To provide a solution to the above requirement, various attempts have been devised. For example, U.S. Pat. No. 6,713,175 discloses a single layer BOPLA film having heat sealability with stretching stability and its polymer has a specific storage elastic modulus. U.S. Pat. No. 6,153,276 discloses a heat sealable PLA based polymer laminate having an amorphous PLA layer and a crystalline PLA base layer. WIPO Patent Application WO 2008/020726 discloses heat sealable BOPLA film having a B/A and B/A/B layer structure. Japanese Patent Application JP2004-358721A also describes a PLA film having a core layer with a heat sealable PLA skin layer that includes a slippery agent such as lubricant.

In addition, U.S. Pat. No. 7,368,160 discloses a co-extruded BOPLA film displaying improved winding and manufacturability and end-user performance. U.S. Pat. No. 6,600,008 discloses an aliphatic polyester film and gas barrier film having specific surface, thermal and orientation properties for packaging applications. U.S. Pat. No. 7,390,558 discloses a primer-coated biaxially oriented aliphatic polyester film having an amorphous skin layer and its inorganic deposited film having about 3 to 5 cc/m2/day of oxygen gas permeability. U.S. Patent Publication No. 2010/0040904 disclose a co-extrude BOPLA film metallized on a crystalline core PLA layer with metal seeding such as Cu or Ni.

The inventors seek to address the above issues of making high barrier metalized BOPLA films.

BRIEF SUMMARY OF THE INVENTION

Described are metallized multi-layer biaxially oriented polylactic acid base polymer (BOPLA) films with a novel metallization formulation that exhibits improved barrier properties and metal adhesion. The high barrier formulation may include an amorphous PLA layer to achieve significantly higher metal adhesion and can also improve metallized moisture and oxygen barrier. More particularly, the multi-layer BOPLA film also has a heat sealing property without disturbing the high barrier performance and productivity.

Amorphous PLA skin layers often posses a tacky surface. This can make it more difficult to handle these films, especially BOPLA films having two sides of amorphous PLA. This is because the tackiness causes process issues such as wrinkling and blocking. A particular problem for high barrier applications is "metal pick-off". Metal pick-off is a kind of damage to the metallized layer whereby the portions of the vapor-deposited metal are physically removed from the metal receiving layer by the opposite side of the film, when the film is in roll form and can be caused by the tackiness of the film surface. The metallized BOPLA films resolve such issues and provide high barrier performance as well as the wide processability and heat sealability required for packaging film applications.

One embodiment is a metallized PLA film including a metal receiving layer that consists or consists essentially of an amorphous PLA layer on one side of a substantially crystalline PLA core layer. This metal receiving layer formulation significantly improves the metal adhesion of the aluminum layer and also improves the gas barrier of the metallized PLA film when compared to an aluminum metallized PLA film without the metal receiving formulation.

The metallized BOPLA film may have a second amorphous PLA layer on the opposite side of the substantially crystalline PLA core layer to improve the functionality of down-stream converting processes such as a lamination process to other components or films. More particularly, this second surface can be heat sealable to itself (also known as "fin sealable"), or possibly to the first surface (also known as "lap sealable") especially if the metallized layer is properly patterned to expose the surface of the amorphous PLA metal receiving layer.

Another embodiment is a multilayer film including a core layer including polylactic acid base polymer, a first skin layer consisting essentially of amorphous polylactic acid base polymer, and a metal layer on the first skin layer. The core layer may include crystalline polylactic acid base polymer.

The multilayer film may further include a second skin layer consisting essentially of amorphous polylactic acid base polymer. The first skin layer may have a thickness of 2 µm or less. The second skin layer may have a thickness of 2 µm or more. The total thickness of the first skin layer and the second skin layer/a thickness of crystalline core layer may be ≤0.5.

The first skin layer may include 0.01 to 0.3 wt % particles of an average particle size of 0.1 to 3 µm. The second skin layer may include 0.05 to 0.5 wt % particles of an average particle size of 1 to 5 µm. A thickness (t) and diameter (d) of the particles of both of the first skin layer and the second skin layer may have the following relationship: $0.25 \leq t/d \leq 1$. The particles in the first layer may be aluminosilicate particles.

The multilayer film preferably has a moisture vapor transmission rate (MVTR) of 1.0 g/m2/day or less. The multilayer film may be fin and lap sealable. Preferably, the multilayer film is a biaxially oriented film.

Yet another embodiment is a method of making a multilayer film the method includes co-extruding a core layer comprising polylactic acid base polymer and a first skin layer consisting essentially of amorphous polylactic acid base polymer. A metal layer is deposited on the first skin layer.

DETAILED DESCRIPTION OF THE INVENTION

Described are metallized BOPLA film designs with novel formulations and methods of making and using the same. The films exhibit improved barrier, metal adhesion and heat sealability properties.

One embodiment of a PLA film is a biaxially oriented film including a metal receiving skin layer (skin layer A) including an amorphous PLA base polymer and a layer of aluminum on one side of the skin layer A. The skin layer A may be composed entirely of amorphous PLA or may consist essentially of amorphous PLA base polymer.

Figure 1:
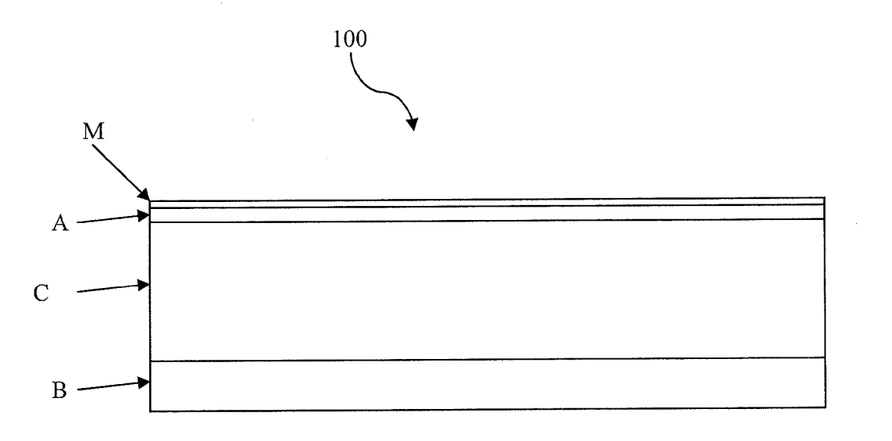
FIG. 1 is an illustration of a multilayer film according to embodiments of the invention.

The preferable structure of the metallized BOPLA film includes at least one core layer (core layer C), two skin layers, A and B, disposed upon each side of core layer C, and a metallized aluminum gas barrier layer deposited upon the side of skin layer A opposite core layer C. One of the two skin layers is addressed as a metal receiving layer (skin layer A) which is adjacent to the metallized aluminum layer, while the other skin layer is addressed as skin layer B. Skin layer B is disposed upon the side of core layer C opposite skin layer A. FIG. 1 illustrates an embodiment of such a multilayer BOPLA film 100 including a core layer C, a skin layer A, a skin layer B, and a metallized aluminum layer M.

The resin forming each layer may mainly contain polylactic acid or polymer delivered from lactic acid as a major component. The content of the polylactic acid of each layer may be 95 wt % or more, preferably 98 wt % or more, most preferably 100 wt % to the total polymeric component of each layer.

The polymer delivered from lactic acid may be made from co-polymerization of lactic acid with the other monomer or monomers, such as glycols, dicarboxylic acids, hydroxycarboxylic acids and lactones. Suitable glycols include, for example, ethylene glycol, propylene glycol, butanediol, heptanediol, hexanediol, octanediole, nonanediol, decandiole, 1,4-cyclohexanedimethanol, neopentyl glycol, glycerol, pentaerythritol, bisphenol A, polyethylene glycol, polypropylene glycol and polytetramethylene glycol. Suitable dicarboxylic acids include, for example, oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, bis (p-carboxyphenyl)methane, anthracenedicarboxylic acid, 4,4'-biphenyl ether carboxylic acid, sodium 5-sulfoisophthalate and 5-tetrabutyl phosphonium isophthalic acid. Suitable hydroxycarboxylic acids include, for example, glycolic acid, hydroxypropionic acid, hydroxyvaleric acid, hydroxycaproic acid and hydroxy benzoic acid. Suitable lactones include, for example, caprolactone, valerolactone, propiolactone, undecalactone and 1,5-oxepane-2-one. From the viewpoints of heat resistance, processability for film making, and cost, the content of these monomers are preferably less than 20 mol %, more preferably less than 15 mol % when the total monomer unit in the polymer delivered from lactic acid is 100 mol %.

At least one core layer (i.e. core layer C) may include a crystalline PLA to provide enough rigidity, flatness and durability for mechanical load and thermal treatment during the biaxial orientation process as well as at the downstream processing such as lamination or bag-forming etc. In order to make a PLA crystalline, it is preferable that the PLA has the content ratio of D-lactic acid and L-lactic acid as 0:100 to 10:90. Although it may not cause significant issue even if the PLA essentially contains only L-lactic acid, too much crystalline PLA may cause deterioration in the film making process; thus, a more preferable ratio between D-lactic and L-lactic is 1:99 to 5:95; a further preferable ratio is 2:98 to 4:96. Preferable examples of crystalline PLA resins that may be used for the core layer C include, for example, NatureWorks® Ingeo™ 4032D (D level=1.4 mol %), 4042D (D level=4.2 mol %). The D-L ratio may be adjusted to the desired level by blending them or blending with any other grade having a higher D % such as Ingeo™ 4060D (D level=12 mol %). Recycled pellet out of the BOPLA film may be used as far as the crystallinity of the Core layer C is retained.

The following method may be utilized to confirm (but is not limited to this method) whether a PLA resin is a crystalline PLA. Raw material PLA chips that are to be used to make the film or resin samples taken from the core layer C are heated for 10 hours at 130° C., then quenched rapidly. Then, using a DSC (Differential Scanning Calorimetry) method substantially in accordance with ASTM D3418-97, the quenched samples are heated from 20° C. to 220° C. at the rate of 10° C./min. The PLA chip or resin sample is a crystalline PLA if a 5 J/g or greater peak from cold crystallization and/or fusion of crystallites is observed.

Both of the skin layers A and B preferably consist or consistent essentially of amorphous PLA. For skin layer A, the essentially amorphous PLA formulation provides desirable high bonding strength between this metal receiving layer and the metal gas barrier layer. This high bonding strength reduces pick-off of the gas barrier layer even when the layer is contacted and rubbed with processing devices such as rolls or cooling drums during processes after metallization.

Accordingly, films with less pick-off defects may be provided with high and consistent gas barrier properties. Also for the skin layer B, the essentially amorphous PLA provides a wide variety of convenience at the downstream converting processes in terms of a broad sealing temperature range, and allows productive and cost-effective bag or pouch-forming. In order to make a PLA amorphous resin, in addition to the method to co-polymerize the other monomer(s) component mentioned above, it is preferable that the amorphous PLA has the content ratio between D-lactic acid and L-lactic acid of 10:90 to 15:85, and preferably 11:89 to 13:87. Preferable examples of amorphous PLA resin used for the skin layer A and B include, for example, NatureWorks® Ingeo™ 4060D (D level=12 mol %).

The following method may be applied to confirm (but is not limited to this method) whether a PLA resin is an amorphous PLA. Raw material PLA chips that are used to make the film or resin samples taken from the skin layer A or B are heated for 10 hours at 130° C., then quenched rapidly. Then, using a DSC method substantially in accordance with ASTM D3418-97, the quenched samples are heated from 20° C. to 220° C. at the rate of 10° C./min. The PLA chip or resin sample is determined to be amorphous PLA if no thermal peaks from cold crystallization and/or fusion of crystallites are observed in the DSC method.

The thickness of the metal receiving skin layer A is preferably 2 µm or less, more preferably 1 µm or less, furthermore preferably 0.5 µm or less. If the thickness is thicker than 2 µm, poor flatness and less thermal stability may occur due to the heat applied to the film during the film making process such as the heat setting process, metallizing process, and the drying process of the printing and/or lamination processes. Especially, deterioration of the metal receiving layer A by damage from the heat of metallization may degrade the barrier properties.

In contrast, thickness of the heat sealing layer B is preferably 2 µm or more in order to impart superior heat seal properties, for example, heat seal strength at a particular sealing temperature, although a thinner layer may also be used such as greater than 1.0 µm or 1.0-1.5 µm. The preferred value for acceptable heat seal strength is 400 g/25 mm or greater at a 250° F. (121° C.) seal temperature which can easily be obtained if the layer B is at least 2 µm thick. For obtaining properties for use in bag-forming processes, such as lower SIT (seal initiation temperature) and higher hot tack strength, the thickness of the layer B can be 2.5 µm or more. Initiation temperatures of 230° F. (110° C.) or less are preferred. Preferred values for hot tack include a minimum 140 g/25 mm at a 250° F. (121° C.) seal temperature. However, a layer that is too thick, for example, 4 µm or more may cause some process deterioration such as poor film profile flatness, winding formation problems, and less heat stability as mentioned above.

The relationship between the thicknesses of the crystalline core layer C and the amorphous skin layers A and B is preferably controlled. If the total thickness of the skin layers A and B (amorphous PLA layers) are too thick, or if the core layer C (crystalline PLA layer) is too thin, the film can suffer from poor profile flatness and become less heat stable. The preferable range of "Total thickness of amorphous skin layer(s)/Total thickness of crystalline core layer" is 0.5 or less, more preferably 0.3 or less, further preferably 0.2 or less. If the ratio is greater than 0.5, poor film profile flatness and less heat stability may occur due to the heat applied to the film during the film making process such as the heat setting process, the metallizing process, the drying process of printing, and the lamination process. To achieve the lower range of "Total thickness of amorphous skin layer(s)/Total thickness of crystalline core layer", an asymmetric structure of the skin layers A and B (different thicknesses of the respective skin layers A and B) is also preferred. To secure the optimum heat sealing properties, the skin layer B may preferably be relatively thick, for example 2 µm or more as mentioned above (but it is preferred to be thin enough to secure the heat seal properties above). The thinner Skin A may be more preferred to keep the total thickness of amorphous layer as thin as possible.

The skin layers A and B contain inorganic or organic particles to give a preferable handling property to the film and functional coefficient of friction properties. Particularly, since both of these skin layers are made from amorphous PLA, which is prone to be sticky compared to regular crystalline PLA, the size and content of particles should be adjusted. In addition, the proper types of particles should be selected. Otherwise, wrinkling, baggy edges, fly winding, blocking etc could occur during winding, metallizing, slitting or laminating processes. Such unfavorable situations may damage the gas barrier layer, creating pin holes or metal pick-off and "light spots" (a defect of metallized aluminum layer which can be detected as light spots when the metallized film is placed on a backlight unit) in the gas barrier layer, thus preventing the desired high gas barrier properties from being achieved. As mentioned above, since the film may preferably have an asymmetric structure (different thicknesses of the respective skin layers A and B), the size and content of the skin layers A and B particles may also be different from each other.

The particle size in the skin layer A (Particle A) is preferably 0.1 to 3 µm average diameter, more preferably 0.5 to 2 µm. The content of Particle A to the skin layer A is preferably 0.01 to 0.3 wt % of the skin layer, more preferably 0.01 to 0.1 wt %. If the particles in the skin layer A are bigger (in terms of size and content) than the above range, it may jeopardize the required high barrier properties because too many large protrusions could cause "light spots" after metallization. Particles in the skin layer B (Particle B) preferably have a 1 to 5

μm average diameter, more preferably 2 to 4 μm. The content of Particle B to the skin layer B is preferably 0.05 to 0.5 wt %, more preferably 0.1 to 0.3 wt % of the layer. If the particles in the skin layer B are bigger (in terms of size and content) than the above range, it may jeopardize the required high barrier properties because too many large protrusions may cause transcription defects onto the gas barrier layer when the film is wound into roll shape (e.g. scratches or pin-holes). Such over-sized and over-amount of particles may make the film hazy which also may not be preferable especially for a clear gas barrier layer such as AlOx or SiOx deposition. If the particles in the skin layers A and B are smaller (in terms of size and/or content) than the above range, it may not contribute well to maintain the required handling and then may cause blocking during winding, metallizing, slitting or laminating processes.

To create uniform protrusions in the skin layers A and B, the relationship between particle size (d μm) and thickness of the skin (t μm) may be preferably $0.25 \leq t/d \leq 1$, more preferably $0.4 \leq t/d \leq 0.9$, further preferably $0.5 \leq t/d \leq 0.8$. If t/d is less than 0.25, the particles in the Skin layers may drop off from the layer during the film making and converting processes which may cause contamination of the processing equipment and may degrade the property requirements. If t/d is greater than 1, the particle may not make the surface uniform, may not make effective protrusions for film handling, and cause unfeasible situation such as blocking as mentioned.

To suppress the harmfully large protrusions of skin layer A for the barrier properties as mentioned above, it may be preferable that the skin layer A not contain particles if the feasible handling properties of the film are assured by the skin layer B or even by the core layer C. Particles in the core layer C may contribute to control the surface topography of the skin layer A even when the skin layer A does not contain particles, especially when the layer A is thin. This means that the particles in the core layer C (Particle C), especially the particles existing close to the interface to the thin skin layer A, may protrude up into the thin skin layer A such that the skin layer A may have gentle sloping protrusions. Such gentle sloping protrusions may not cause "light spots" after metallization because the gas barrier layer can coat and cover these gentle slope.

To create the gently sloping protrusions, the thickness of the skin layer A ($t_a$) and the diameter of the particle C ($d_c$) preferably satisfy the following relation ship: $t_a/d_c \leq 1/3$. If the thickness of the skin layer A is too thick or the diameter of the particle C is too small, the particles in the core layer C would not be able to protrude into the skin layer A. (In another words, the thick skin layer A would cover the small particles underneath the skin layer A.)

As far as keeping the scope and processability properties of the films, suitable inorganic particles in the each layer include, for example, zeolite, calcium carbonate, magnesium carbonate, alumina, silica, aluminum silicate, barium hydroxide, kaolin, kaolinite, talc, clay, diatomite, montmorillonite, titanium oxide and mixture thereof. Suitable organic particles in the each layer include, for example, cross-linked polymeric particles such as polymethoxysilane compounds, polystyrene compounds, acrylic compounds, polyurethane compounds, polyester compounds, fluorine compound cross-linked particles and mixture thereof.

Preferable particles are aluminum silicate particles. It was found that aluminum silicate can be dispersed uniformly in PLA by a compounding (melt blend) method, which can suppress the big protrusions in skin layers A and B. It was found that aluminum silicate shows good compatibility with PLA, which can suppress contamination of processing equipment caused by the particle being dropped off particularly when the skin layer is relatively thin to keep the surface topography uniform as mentioned above. Such compatibility also makes the film less hazy because the cavity around the particle may be minimized. A preferable example of aluminum silicate used for the films herein include, for example, Mizusawa Chemical's Silton™ JC series and Silton™ AMT series.

In comparison, it was observed that a typical silica slurry is prone to cause aggregation and typical silicone particles are prone to be incompatible with PLA causing cavities or concavities around the particles. As a result, such films containing such non-desirable particles showed poor barrier and/or higher haze.

In the resulting surface properties, preferable ranges of CoF (coefficient of friction) may be 0.3 to 0.8, more preferably, 0.4 to 0.7. If the CoF is higher than 0.8, the film may be so tacky as to cause blocking or poor winding, which can cause metal damage to occur. If the CoF is lower than 0.3, the surface of the film may be too rough so as to cause poor barrier properties due to large or too many protrusions and may cause scratching.

Preferable ranges of the surface roughness of the skin layer A may be 10 to 50 nm in SRa (Surface average roughness) and less than 1500 nm in SRz (five highest peaks and lowest valleys), more preferably 20 to 45 nm in SRa and less than 1000 nm in SRz. If the surface of the skin layer A has a SRa of less than 10 nm, the film may be so tacky as to cause blocking, poor winding or static charge on the surface, which can cause metal damage to occur. If the surface of the skin layer A has a surface roughness of greater than 50 nm in SRa or higher than 1500 nm in SRz, the film may be too rough and may have poor barrier properties due to too big or too many protrusions.

The "light spots" mentioned above and metal pick-off defects caused by big protrusions or by weak metal bonds significantly degrade the moisture barrier. Basically, as no contribution for moisture barrier can be expected from PLA base film, controlling metal damage is much more critical for metallized PLA films than for metallized OPP or PET films. By choosing proper particle type and size and thickness of the skin layer A, "light spot" defects can be reduced and the number of big protrusions that cannot be covered by the thin metallization layer can be suppressed. The essentially amorphous skin layer A may be partially molten during the heat setting process of the film making process, which may help smoothen any sharp protrusions, which in turn, makes the metallization layer even and continuous.

Other additives can be added as long as they do not interfere with the desired characteristics of the film. For example, the core layer C may also include an amount of processing aid at 1.0 to 5.0 wt % of the core layer. The addition of processing aid such as Biomax™ Strong 120 from DuPont helps reduce internal stresses during orientation, particularly transverse orientation. The use of this processing aid can enable transverse orientation rates in excess of 4-5 TDX; up to 7 to 10.5 TDX have been achieved. By using this processing aid, it may be possible to improve productivity of making oriented PLA films. An optional amount of amorphous PLA, up to 20 wt % of the core layer C may also be added. This may be desirable to reduce brittleness of the biaxially oriented PLA film. Other examples of additives that may be used include flame retardant agents, thermal stabilizers, light stabilizers, anti-oxidants, hydrophobic agents, release agents, coupling agents, chain extenders, end group capping agents, oxygen absorbers, moisture absorbers, anti-coloring agents, UV absorbers, anti-static agents, plasticizers, nucleating agents, lubricants, adhesive improvers, and pigments. Typical amounts of such additives may be 0 to 5 wt % to the total polymeric component of each layer.

The gas barrier layer may be applied using any available deposition method such as physical vapor deposition, or chemical vapor deposition. The most common method is physical vapor deposition of an aluminum layer in a vacuum, in which aluminum is heated in absolute pressure preferably less than $10^{-3}$ mbar. The low pressure allows aluminum to form a vapor at a considerably lower temperature so that it can be applied without thermal damage to the film. The aluminum can be in the form of a wire that is fed to the surface of an electrically heated ceramic plate known as a boat. Or the aluminum can be in the form of an ingot that is heated within a crucible. The aluminum vapor is condensed on the film surface in an open span or with the film against a chill roll to dissipate the heat of the vapor. The condensed aluminum vapor forms grains of solid aluminum with a total thickness of 50 to 1000 angstroms. Preferably, the thickness of the aluminum layer is between 300 to 500 angstroms. A thin aluminum layer may not provide a very high gas barrier, and thick layers are difficult and inefficient to apply, and in practice provide diminishing performance vs. additional thickness. Instead of the actual thickness of aluminum layer, optical densities (OD) may be used. Preferable ranges of OD include 1.5 to 3.5, more preferably 2.0 to 3.0.

To achieve further metal bond strength, an additional deposition anchorage layer, such as Cu seeding or Ni seeding may be applied before the main barrier layer is metallized. As described in the specification of U.S. Patent Publication No. 2010/0040904, the metal anchorage layer is formed by a method wherein a cathode metal functioning as a discharging electrode is sputtered onto one side of the first skin layer under a glow discharge inside a vacuum chamber such as used commonly in vapor deposition of metals, and in which said the first skin layer surface is also activated or discharge-treated at the same time. The film is treated in this manner typically in the low vacuum pressure section of the metallizing chamber where the unwinding film roll is located and the film is passed through this glow discharge treater prior to entering the high vacuum section of the metallizer where the vapor-deposition evaporation boats are located. The glow discharge treater uses a high voltage between the anode and cathode to produce free electrons. A gas is introduced into the treater and the free electrons combine with the gas to produce ions. Magnetic fields guide and accelerate the gas ions onto the metal cathode target which then emit metal ions. These metal ions are then deposited upon the first skin layer, creating an anchorage layer which may be a mono-layer of the metal atoms and which may be an incompletely contiguous or enclosed layer. Suitable gases for the discharge gas in the discharge atmosphere are those chosen from oxygen, nitrogen, argon, carbon dioxide, water vapor, and blends thereof. Preferably, the chosen gas is oxygen or nitrogen, and more preferably, nitrogen.

As mentioned above, the suppression of metal pick-off defect is important in order to obtain high barrier property. A metal layer having high metal bond strength reduces the chance of metal pick-off significantly. Preferable metal bond strength is 100 g/in or greater, more preferably 200 g/in or greater. Poor metal bond can cause poor gas barrier properties, as well as delamination at the downstream converting or bag-making processes.

In general, preferred values of MVTR may be 2.0 g/m$^2$/day or less, more preferably 1.0 g/m$^2$/day or less, further preferably 0.5 g/m$^2$/day or less at 38° C. and 90% relative humidity.

In general, preferred values of O$_2$TR may be equal or less than 4 cc/m$^2$/day and preferably 3 cc/m$^2$/day or less at 23° C. and 0% relative humidity.

This invention will be better understood with reference to the following examples, which are intended to illustrate specific embodiments within the overall scope of the invention.

EXAMPLES

Test methods: The various properties and quality in the Examples were measured by the following methods:

Coefficient of Friction of the films was measured with the use of a Testing Machine, Inc. slip tester (TMI-Model #32-06) using ASTM D1894-95. The films were cut to specified sizes. One piece of film was clamped, the desired test surface of the sample up, onto a 18" MD (machine direction) and 6" TD (transverse direction) glass plate. Another piece of the film was mounted using double-sided tape to a 2.5" and 2.5" 200 g sled, with the desired test surface of the sample down. The sled was placed on top of the glass plate and attached to the load sensing device. The sled was then over the film on the glass plate at 6 in/min. The measuring distance used to calculate the value of static was 1" and 4" for dynamic CoF.

Surface roughness, SRa and SRz. The surface roughnesses of the films were measured with a stylus type three-dimensional surface roughness meter ET-30HK and surface roughness analyzer SPA-11 (Kosaka Laboratory Ltd.). The parameters of the measurement are summarized below.
Mode: STYLUS, ROUGHNESS P-Mode, Y-Scan
Stylus radius: 0.5 μm
Load: 10 mg
Cut-off value: 50 μm
X-Scan speed: 20 μm/sec
X-Scan pitch: 1 μm
Measuring length: 500 μm
Y-Scan lines: 41
Y-Scan Pitch: 5 μm
Gain: 1
Slope Comp: Off
Standard area: 0.1 mm$^2$, (Measured area: 0.102 mm$^2$)

The heat seal strength of the films was measured using a Sentinel sealer model 12 ASL at 30 psi, 0.5 second dwell time, with heated flat upper seal jaw TEFLON coated, and unheated lower seal jaw, rubber with glass cloth-covered. The film is heat-sealed sealant-side to sealant-side at the desired seal temperature range and increments in the Sentinel sealer (e.g. 180-290° F. at 10° F. increments) and then the respective seal strengths are measured using an Instron model 4201 tensile tester. The heat-sealed samples are cut into 1-inch wide strips, the two unsealed tails are placed in the upper and lower Instron clamps and the sealed tail supported at a 90° angle to the two unsealed tails for a 90° T-peel test. The peak and average seal strength is recorded. Heat seal initiation temperature is the lowest temperature at which minimum 200 g/in seal strength is achieved. For a fin seal strength, the Skin layer B side and the Skin layer B side are used, and for a lap seal strength, the Skin layer A side and the Skin layer B side are used respectively.

The hot tack strength of the films was measured using a Lako Tool hot tack/scaler model SL10 at 30 psi, 0.5 second dwell time, with heated flat lower seal jaw Teflon coated, and unheated upper seal jaw and with delay set to 0 seconds. The film sample is cut into a strip 13 inches long by 1 inch wide and fitted into the Lako SL10 film holder. The film is then heat-sealed sealant-side to sealant-side at the desired seal temperature range and increments in the Lako sealer (e.g. 180-290° F. at 10° F. increments) and then the respective hot tack strengths are measured by the Lako SL10 sealer automatically. The peak hot tack strength is recorded. The preferred values for acceptable hot tack are 150 W in or greater at 250° F. seal temperature.

The heat seal and hot tack seal initiation temperature (SIT) were measured by using the above methods using the Sentinel 12 ASL or Lako Tool SL10 hot tack sealer. Heat seal initiation temperature is the lowest temperature at which minimum 200 g/in seal strength is achieved. Hot tack initiation temperature is the lowest temperature at which minimum 150 g/in hot tack is achieved.

The flatness of the film was observed when the film was coming out of the TD stretching tenter of the film making process (at the exit of the tenter) and evaluated into one of five levels as defined below.

Level 5: No flatness distortion was observed.
Level 4: Slight unevenness or distortion of flatness was observed, but did not cause any issue at the downstream processing.
Level 3: Obvious unevenness or distortion of flatness was observed. Did not cause significant processing issue at the downstream processing such as web break etc, but was not considered as good customer roll.
Level 2: Very severe unevenness or distortion of flatness was observed. Very difficult to pursue the downstream processing.
Level 1: Holes or film breaks occurred due to poor flatness. Could not obtain windable web for the downstream processing.

The metal adhesion was measured by heat sealing on a Sentinel Sealer model 12 ASL at 220° F. (104.4° C.) seal temperature, 15 second dwell, and 15 psi (103.42 kPa) seal jaw pressure, a piece of 1-mil (25 µm) thick Ethylene Acrylic Acid polymer film (EAA) to the metallized surface of a single sheet of metallized film and measuring the 180° peel strength of the metal from the substrate substantially in accordance with AIMCAL (Association of Industrial Metallizers, Coaters, and Laminators) test procedure TP-105-92. The test procedure and a kit of materials can be obtained from AIMCAL's website www.aimcal.com. The Metal Adhesion Test Kit is designed to permit testing using TP-105-92. The test kit contains 2 rolls of 3M™ tape #610, 2 rolls of EAA film and an AIMCAL Metallizing Technical Reference Manual. The test kit contains enough material to do at least 100 tests as described in the Technical Reference Manual, (TP-105-92). The test procedure used in testing the samples used in the examples of this application is described in AIMCAL Metallizing Technical Reference (Third Edition, 2001).

The moisture transmission rates of the films were measured using a Mocon Permatran 3/31 unit substantially in accordance with ASTM F1249. A hand-lamination was made of the metallized PLA film using a biaxially oriented PLA film 20 µm Evlon® that can be purchased from Bi-Ax Inc. which is predominantly composed of crystalline PLA with a pressure-sensitive adhesive applied to the treated side of the Evlon® film in order to protect the metallized film surface from handling damage. (Usually in this industry, a 1 to 2-mil (25-50 µm) cast polyolefin film with a pressure-sensitive adhesive (for example Starmark™ of 3M Company, another example is a 1-mil (25 µm) cast LDPE film with a pressure-sensitive adhesive available from Berry Plastics, Inc. 502A clear LDPE tape with acrylic-based pressure sensitive adhesive) may be used for the protective film. However, since such polyolefin film itself may have high moisture barrier property, the true MVTR number of the metallized PLA film may not be evaluated properly. Therefore, the 80 ga PLA film was used as the protective film. There is no limitation of the grade of the protective PLA film as-far as the PLA protective film itself has much higher MVTR (>10 g/m²/day) or so.) The pressure-sensitive adhesive side of the protective PLA film may be adhered to the metallized side of the example film with a rubber roller to eliminate air pockets, bubbles, and wrinkles. The gas barrier layer side faces to the moisture gas stream.

Oxygen transmission rates of the films were measured using a Mocon Oxtran 2/20 unit substantially in accordance with ASTM D3985. A hand-lamination was made of the metallized PLA film using the same PLA protective film above in order to protect the metallized film surface from handling damage. The pressure-sensitive adhesive side of the protective film may be adhered to the metallized side of the example film with a rubber roller to eliminate air pockets, bubbles, and wrinkles. The gas barrier layer side faces to the moisture oxygen stream.

Materials:

Materials used in the Examples and Comparative Examples to make the BOPLA films are summarized below.

Crystalline polylactic acid, PLA4032D (Natureworks LLC), relative viscosity 4.0, 1.4 mol % D Amorphous polylactic acid, PLA 4060D (Natureworks LLC), relative viscosity 3.5, 12.0 mol % D Aluminum silicate particle, Silton JC-20 (Mizusawa Chemical), average size is 2 µm Aluminum silicate particle, Silton JC-30 (Mizusawa Chemical), average size is 3 µm Aluminum silicate particle, Silton JC-40 (Mizusawa Chemical), average size is 4 µm Aluminum silicate particle, Silton AMT-08L (Mizusawa Chemical), average size is 0.9 µm Silicone particle, Tospearl 120 (Toshiba Silicone), average size is 2 µm Silica slurry, Silicia 310 (Fuji-silica), average size is 2.5 µm In advance of film making, the above particles were compounded into 4032D crystalline PLA or 4060D amorphous PLA as following to make master batches. The choice of which carrier resin is used is dependant upon which layer the particle is to be employed in. For example, if the particles are to be employed in the skin layers A and B—which are substantially amorphous PLA layers—the respective carrier resin for the particle masterbatch may be amorphous PLA. Similarly, if the particles were to be used in the substantially crystalline core layer C, the carrier PLA resin for the particle masterbatch may be crystalline PLA. The carrier PLA pellets and the powder of particles were pre-blended as the ratio shown in Table 1 and mixed well in a conventional tumbler mixer. The blended materials were fed to a co-rotating twin screw extruder at 370° F. to 390° F. of the extruder temperature. The polymer melt was extruded through a 6-hole strand die that was set at 415° F. and the actual temperature of polymer flow was about 420° F. to 440° F. The melt strands were cooled to be solid in a water bath then pelletized by a Berlinger multi-knife cutter. The resulting size of the master batch pellets was about 40-60 pellets/gram. The pellets were dried and/or crystallized (if crystallizable), then sealed in a foil-lined bag to avoid moisture uptake during storage.

Examples 1a, 1b, 1e to 1i and Comparative Examples 1c, 1d

Materials were blended in accordance with Table 2 and dried well at 200 ppm or less moisture content using a conventional oven. Moisture content was measured via Karl-Fischer titration. The multilayer coextruded laminate sheet was coextruded at a processing temperatures of 190° C. at a throat zone of the extruder and at 210° C. at the rest of extrusion system through a die. The output of screw of each layer was adjusted to the desired ratio of the thickness. The melt curtain was casted onto a cooling drum whose surface temperature was set at 25° C. to solidify the non-oriented laminate sheet. The non-oriented laminate sheet was stretched in the longitudinal direction at 70° C. at a stretching ratio of 3 times the original length and the resulting stretched sheet was cooled down and annealed at 25° C. to obtain a uniaxially oriented laminate sheet. The uniaxially oriented laminate sheet was introduced into a tenter and preliminarily heated at 65° C. and stretched in the transverse direction (TD) at 75° C. at a stretching ratio of 4 times the original length and then heat-set at 140° C. and then relaxed (3%) in the TD at 120° C. to reduce internal stresses due to the orientation and minimize shrinkage and give a relatively thermally stable biaxially oriented sheet. After biaxial orientation, the thickness of the coextruded film, its properties and process feasibility overall are summarized in Table 3A and 4A. The film of Example 1i could not be wound into a roll due to very poor flatness and web breaks and could not be used for the further down stream processing.

As a basefilm for metallization, the roll was placed inside a vacuum chamber metallizer for vapor deposition metallization using aluminum. Prior to aluminum deposition, the film was treated using sputtering with a copper cathode. This treater was set up in the low vacuum section of the metallizer where the unwinding roll was located and the film is passed through this treater prior to entering the high vacuum section of the metallizer where the evaporation boats were located. The treater used high voltage between the anode and cathode to produce free electrons. Nitrogen gas was introduced into the treater and the free electrons combine with the gas to produce ions. Magnetic fields guide and accelerate the ions onto the copper cathode target which then emit copper ions at a voltage of 400 kW and 1.5 L/min oxygen or nitrogen gas flow. These copper ions were deposited onto the polylactic acid polymer substrate, creating a mono-atomic copper layer, ca. 20 ng/cm$^2$ (nanogram/sq. centimeter) thick.

The film was then passed into the high vacuum deposition chamber of the metallizer which was metallized using aluminum to a nominal optical density target of 2.4. The metallized rolls were then slit on a film slitter and tested for properties, which is summarized with the metallized film quality in Table 4A. Examples 1a, 1b and 1e to 1h metallized the amorphous skin layer A and achieved targeted gas barrier properties and significantly improved metal adhesion with very few light spots. The improved metal adhesion helped reduce any potential metal pick-off which in turn, helped improve barrier properties. On the other hand, Comparative Examples 1c and 1d metallized on the non-essentially amorphous PLA layer showed moisture barrier poorer than target and observed heavy amount of metal pick-off due to the poorer metal bond. Examples 1a, 1b 1e and 1h having the amorphous Skin layer B also achieved preferred fin heat sealing strength, while Examples 1f and 1g did not.

Examples 2a to 2i

The BOPLA films were made in the same manner as described with respect to Example 1 except using different layer blends as shown in Table 2. The thickness of the coextruded film, its properties and process feasibility overall are summarized in Table 3B and 4B. The film of Example 2c could not be used for the further down stream processing due to the poor flatness. Then, the metallized BO-PLA films were made as the same manner as Example 1. The metallized rolls were then slit on a film slitter and tested; the results of these tests are summarized with the metallized film quality in Table 4B. Examples 2a and 2b having an amorphous skin layer A with a preferred formulation of the layers showed the best or better moisture barrier properties. The rest of these Examples showed marginal moisture barrier properties and had an observable amount of metal pick off and/or "light spot" defects of the metallized layer due to the unfavorable process issues.

Examples 3a to 3d

The BOPLA films were made in the same manner as Example 1 except that different layer blends as shown in Table 2 were used. The skin layer A of these samples did not essentially contain particles. The thickness of the coextruded film, its properties and process feasibility overall are summarized in Table 3C and 4C. Then, the metallized BO-PLA films were made as the same manner as Example 1. The metallized rolls were then slit on a film slitter and tested; the results of these tests are summarized with the metallized film quality in Table 4C. The Examples 3b and 3c having an amorphous skin layer A with preferred formulations of the layers showed the best or better moisture barrier properties. The rest of these Examples showed marginal moisture barrier properties and had an observable amount of metal pick off and/or "light spot" defects of the metallized layer due to the unfavorable process issues.

Examples 4a and 4b

The BOPLA films were made as the same manner as Example 1 except that different layer blends as shown in Table 2 were used. The skin layer A of these samples contained different types of particles. The thickness of the coextruded film, its properties and process feasibility overall are summarized in Table 3C and 4C. Then, the metallized BO-PLA films were made in the same manner as Example 1. The metallized rolls were then slit on a film slitter and tested; the results of these tests are summarized with the metallized film quality in Table 4C. Examples 4a and 4b showed marginal moisture barrier properties and had a certain amount of "light spot" defects of the metallized layer due to the unfavorable protrusion made by the particles.

Example 5

The Example 1a was repeated except that the copper sputter was not used in the chamber of the metallization; and voltage and oxygen gas flow was set to zero or turned off. Only vapor deposition of aluminum upon the skin layer A was done. The moisture barrier property of Example 5 was not as good as Example 1a. Results are shown in Table 4C.

Examples 1-5 are summarized below in Tables 1, 2, 3A-3C, and 4A-4C

TABLE 1

|  | Particles | Content wt % | Carrier resin |
|---|---|---|---|
| Master batch a | JC-20 | 2% | 4060D |
| Master batch b | JC-30 | 2% | 4060D |
| Master batch c | JC-40 | 2% | 4060D |
| Master batch d | AMT-08L | 2% | 4060D |
| Master batch e | Silicia 310 (S-310) | 2% | 4060D |
| Master batch f | Tospearl 120 (TP-120) | 2% | 4060D |
| Master batch g | JC-30 | 2% | 4032D |

TABLE 2

| Layer | Material | Ex 1a and 5 | Ex 1b | Comp Ex 1c | Comp Ex 1d | Ex 1e | Ex 1f | Ex 1g | Ex 1h | Ex 1i |
|---|---|---|---|---|---|---|---|---|---|---|
| Skin layer A | 4032D | | 10 | 25 | 50 | | | | | |
| | 4060D | 95 | 85 | 70 | 45 | 95 | 95 | 95 | 95 | 95 |
| | Master batch a | 5 | 5 | 5 | 5 | 5 | 5 | 5 | 5 | 5 |
| Skin layer B | 4032D | | | | | 10 | 25 | 50 | | |
| | 4060D | 92.5 | 92.5 | 92.5 | 92.5 | 82.5 | 67.5 | 42.5 | 92.5 | 92.5 |
| | Master batch b | 7.5 | 7.5 | 7.5 | 7.5 | 7.5 | 7.5 | 7.5 | 7.5 | 7.5 |
| Core layer C | 4032D | 85 | 85 | 85 | 85 | 85 | 85 | 85 | 75 | 10 |
| | 4060D | 15 | 15 | 15 | 15 | 15 | 15 | 15 | 25 | 90 |

| Layer | Material | Ex 2a | Ex 2b, 2c, 2h | Ex 2d | Ex 2e | Ex 2f | Ex 2g | Ex 2i |
|---|---|---|---|---|---|---|---|---|
| Skin layer A | 4060D | 97.5 | 97.5 | 93.75 | 97.5 | 97.5 | 97.5 | 97.5 |
| | Master batch a | | 2.5 | 6.25 | 2.5 | 2.5 | | 2.5 |
| | Master batch c | | | | | | 2.5 | |
| | Master batch d | 2.5 | | | | | | |
| Skin layer B | 4060D | 92.5 | 92.5 | 92.5 | 97.5 | 62.5 | 92.5 | 92.5 |
| | Master batch b | | 7.5 | 7.5 | 2.5 | 37.5 | 7.5 | |
| | Master batch c | 7.5 | | | | | | |
| | Master batch d | | | | | | | 7.5 |
| Core layer C | 4032D | 85 | 85 | 85 | 85 | 85 | 85 | |
| | 4060D | 15 | 15 | 15 | 15 | 15 | 15 | |

| Layer | Material | Ex 3a | Ex 3b, 3c, 3d | Ex 4a | Ex 4b |
|---|---|---|---|---|---|
| Skin layer A | 4060D | 100 | 100 | 95 | 95 |
| | Master batch e | | | 5 | |
| | Master batch f | | | | 5 |
| Skin layer B | 4060D | 92.5 | 92.5 | 92.5 | 92.5 |
| | Master batch b | 7.5 | 7.5 | 7.5 | 7.5 |
| Core layer C | 4032D | 85 | 77.5 | 85 | 85 |
| | 4060D | 15 | 15 | 15 | 15 |
| | Master batch g | | 7.5 | | |

TABLE 3A

| | | | Ex 1a | Ex 1b | Comp Ex 1c | Comp Ex 1d | Ex 1e | Ex 1f | Ex 1g | Ex 1h | Ex 1i |
|---|---|---|---|---|---|---|---|---|---|---|---|
| Base film design | Skin layer A | D % | 12 | 10.94 | 9.35 | 6.7 | 12 | 12 | 12 | 12 | 12 |
| | | Amorphous or Crystalline | Am | Am | Cry | Cry | Am | Am | Am | Am | Am |
| | | Particle A Type | JC-20 | JC-20 | JC-20 | JC-20 | JC-20 | JC-20 | JC-20 | JC-20 | JC-20 |
| | | Size/μm | 2 | 2 | 2 | 2 | 2 | 2 | 2 | 2 | 2 |
| | | Content/wt % | 0.1 | 0.1 | 0.1 | 0.1 | 0.1 | 0.1 | 0.1 | 0.1 | 0.1 |
| | | Thickness/μm | 1 | 1 | 1 | 1 | 1 | 1 | 1 | 1 | 1 |
| | | t/d | 0.50 | 0.50 | 0.50 | 0.50 | 0.50 | 0.50 | 0.50 | 0.50 | 0.50 |
| | Skin layer B | D % | 12 | 12 | 12 | 12 | 10.94 | 9.35 | 6.7 | 12 | 12 |
| | | Amorphous or Crystalline | Am | Am | Am | Am | Am | Cry | Cry | Am | Am |
| | | Particle B Type | JC-30 | JC-30 | JC-30 | JC-30 | JC-30 | JC-30 | JC-30 | JC-30 | JC-30 |
| | | Size/μm | 3 | 3 | 3 | 3 | 3 | 3 | 3 | 3 | 3 |
| | | Content/wt % | 0.15 | 0.15 | 0.15 | 0.15 | 0.15 | 0.15 | 0.15 | 0.15 | 0.15 |
| | | Thickness/μm | 2 | 2 | 2 | 2 | 2 | 2 | 2 | 2 | 2 |
| | | t/d | 0.67 | 0.67 | 0.67 | 0.67 | 0.67 | 0.67 | 0.67 | 0.67 | 0.67 |
| | Core layer C | D % | 3 | 3 | 3 | 3 | 3 | 3 | 3 | 4.05 | 10.94 |
| | | Amorphous or Crystalline | Cry | Cry | Cry | Cry | Cry | Cry | Cry | Cry | Am |
| | | Particle C Type | n/a | n/a | n/a | n/a | n/a | n/a | n/a | n/a | n/a |
| | | Size/μm | n/a | n/a | n/a | n/a | n/a | n/a | n/a | n/a | n/a |
| | | Content/wt % | n/a | n/a | n/a | n/a | n/a | n/a | n/a | n/a | n/a |
| | | Thickness/μm | 17 | 17 | 17 | 17 | 17 | 17 | 17 | 17 | 17 |
| | | Total thickness of amorphous skin layer(s)/ Total thickness of crystalline core layer | 0.18 | 0.18 | 0.12 | 0.12 | 0.18 | 0.06 | 0.06 | 0.18 | ∞ |

TABLE 3B

| | | | Ex 2a | Ex 2b | Ex 2c | Ex 2d | Ex 2e | Ex 2f | Ex 2g | Ex 2h | Ex 2i |
|---|---|---|---|---|---|---|---|---|---|---|---|
| Base film design | Skin layer A | D % | 12 | 12 | 12 | 12 | 12 | 12 | 12 | 12 | 12 |
| | | Amorphous or Crystalline | Am | Am | Am | Am | Am | Am | Am | Am | Am |
| | | Particle A Type | AMT-08L | JC-20 | JC-20 | JC-20 | JC-20 | JC-20 | JC-40 | JC-20 | JC-20 |
| | | Size/μm | 0.9 | 2 | 2 | 2 | 2 | 2 | 4 | 2 | 2 |
| | | Content/wt % | 0.05 | 0.05 | 0.05 | 0.125 | 0.05 | 0.05 | 0.05 | 0.05 | 0.05 |

TABLE 3B-continued

|  |  |  | Ex 2a | Ex 2b | Ex 2c | Ex 2d | Ex 2e | Ex 2f | Ex 2g | Ex 2h | Ex 2i |
|---|---|---|---|---|---|---|---|---|---|---|---|
|  |  | Thickness/μm | 0.5 | 2 | 2 | 1 | 1 | 1 | 0.75 | 3 | 1 |
|  |  | t/d | 0.56 | 1.00 | 1.00 | 0.50 | 0.50 | 0.50 | 0.19 | 1.50 | 0.50 |
| Skin layer B | | D % | 12 | 12 | 12 | 12 | 12 | 12 | 12 | 12 | 12 |
|  | Amorphous or Crystalline | | Am | Am | Am | Am | Am | Am | Am | Am | Am |
|  | Particle B | Type | JC-40 | JC-30 | JC-30 | JC-30 | JC-30 | JC-30 | JC-30 | JC-30 | AMT-08L |
|  |  | Size/μm | 4 | 3 | 3 | 3 | 3 | 3 | 3 | 3 | 0.9 |
|  |  | Content/wt % | 0.15 | 0.15 | 0.15 | 0.15 | 0.03 | 0.75 | 0.15 | 0.15 | 0.15 |
|  |  | Thickness/μm | 2.5 | 2.5 | 3 | 2.5 | 2.5 | 2.5 | 2.5 | 2.5 | 1.5 |
|  |  | t/d | 0.63 | 0.83 | 1.00 | 0.83 | 0.83 | 0.83 | 0.83 | 0.83 | 1.67 |
| Core layer C | | D % | 3 | 3 | 3 | 3 | 3 | 3 | 3 | 3 | 3 |
|  | Amorphous or Crystalline | | Cry | Cry | Cry | Cry | Cry | Cry | Cry | Cry | Cry |
|  | Particle C | Type | n/a | n/a | n/a | n/a | n/a | n/a | n/a | n/a | n/a |
|  |  | Size/μm | n/a | n/a | n/a | n/a | n/a | n/a | n/a | n/a | n/a |
|  |  | Content/wt % | n/a | n/a | n/a | n/a | n/a | n/a | n/a | n/a | n/a |
|  |  | Thickness/μm | 17 | 10 | 9 | 17 | 17 | 17 | 17 | 17 | 17 |
| Total thickness of amorphous skin layer(s)/ Total thickness of crystalline core layer | | | 0.18 | 0.45 | 0.56 | 0.21 | 0.21 | 0.21 | 0.19 | 0.32 | 0.15 |

TABLE 3C

|  |  |  |  | Ex 3a | Ex 3b | Ex 3c | Ex 3d | Ex 4a | Ex 4b | Ex 5 |
|---|---|---|---|---|---|---|---|---|---|---|
| Base film design | Skin layer A | | D % | 12 | 12 | 12 | 12 | 12 | 12 | 12 |
|  |  | Amorphous or Crystalline | | Am | Am | Am | Am | Am | Am | Am |
|  |  | Particle A | Type | n/a | n/a | n/a | n/a | S-310 | TP-120 | JC-20 |
|  |  |  | Size/μm | n/a | n/a | n/a | n/a | 2 | 2 | 2 |
|  |  |  | Content/wt % | 0 | 0 | 0 | 0 | 0.1 | 0.1 | 0.1 |
|  |  |  | Thickness/μm | 1 | 0.5 | 1 | 2 | 1 | 1 | 1 |
|  |  |  | t/d | ∞ | ∞ | ∞ | ∞ | 0.50 | 0.50 | 0.50 |
|  | Skin layer B | | D % | 12 | 12 | 12 | 12 | 12 | 12 | 12 |
|  |  | Amorphous or Crystalline | | Am | Am | Am | Am | Am | Am | Am |
|  |  | Particle B | Type | JC-30 | JC-30 | JC-30 | JC-30 | JC-30 | JC-30 | JC-30 |
|  |  |  | Size/μm | 3 | 3 | 3 | 3 | 3 | 3 | 3 |
|  |  |  | Content/wt % | 0.15 | 0.15 | 0.15 | 0.15 | 0.15 | 0.15 | 0.15 |
|  |  |  | Thickness/μm | 2.5 | 2.5 | 2.5 | 2.5 | 2. | 2 | 2 |
|  |  |  | t/d | 0.83 | 0.83 | 0.83 | 0.83 | 0.67 | 0.67 | 0.67 |
|  | Core layer C | | D % | 3 | 3 | 3 | 3 | 3 | 3 | 3 |
|  |  | Amorphous or Crystalline | | Cry | Cry | Cry | Cry | Cry | Cry | Cry |
|  |  | Particle C | Type | n/a | JC-30 | JC-30 | JC-30 | n/a | n/a | n/a |
|  |  |  | Size/μm | n/a | 3 | 3 | 3 | n/a | n/a | n/a |
|  |  |  | Content/wt % | n/a | 0.15 | 0.15 | 0.15 | n/a | n/a | n/a |
|  |  |  | Thickness/μm | 17 | 17 | 17 | 17 | 17 | 17 | 17 |
|  | Total thickness of amorphous skin layer(s)/ Total thickness of crystalline core layer | | | 0.21 | 0.18 | 0.21 | 0.26 | 0.18 | 0.18 | 0.18 |

TABLE 4A

|  |  |  |  | Ex 1a | Ex 1b | Comp Ex 1c | Comp Ex 1d | Ex 1e | Ex 1f | Ex 1g | Ex 1h | Ex 1i |
|---|---|---|---|---|---|---|---|---|---|---|---|---|
| Properties of Base film | CoF | A/B | μd | 0.50 | 0.48 | 0.40 | 0.38 | 0.49 | 0.48 | 0.44 | 0.50 | n/a |
|  |  |  | μs | 0.45 | 0.43 | 0.38 | 0.36 | 0.47 | 0.46 | 0.42 | 0.45 | n/a |
|  | Roughness | Skin A | SRa/nm | 34 | 36 | 38 | 37 | 33 | 33 | 35 | 33 | n/a |
|  |  |  | SRz/nm | 780 | 820 | 810 | 800 | 790 | 840 | 770 | 780 | n/a |
|  |  | Skin B | SRa/nm | 49 | 51 | 52 | 50 | 48 | 50 | 53 | 52 | n/a |
|  |  |  | SRz/nm | 1100 | 1050 | 1100 | 1150 | 1100 | 1050 | 1200 | 1100 | n/a |
|  | Heat seal strength | Skin B/ Skin B | g/in | 400 | 400 | 400 | 400 | 400 | 300 | 0 | 400 | n/a |
|  |  |  | Initiation temp/° F. | 220 | 220 | 220 | 220 | 220 | 230 | n/a | 220 | n/a |
|  |  | Skin A/ Skin B | g/in | 300 | 300 | 300 | 100 | 250 | 250 | 100 | 300 | n/a |
|  |  |  | Initiation temp/° F. | 220 | 220 | 220 | 230 | 230 | 230 | 240 | 220 | n/a |
|  |  | Flatness (Level 5, 4, 3, 2, 1) | | 5 | 5 | 5 | 5 | 5 | 5 | 5 | 4 | 1 |
|  |  | The other notes | | | | | | | | | | |
| Properties of MET film | | Metal bond g/in | | 430 | 180 | 70 | 20 | 420 | 410 | 400 | 410 | n/a |
|  |  | MVTR g/m²/day | | 0.4 | 0.7 | 2.2 | 2.1 | 0.4 | 0.4 | 0.4 | 0.4 | n/a |
|  |  | O²TR cc/m²/day | | 2.5 | 3 | 5 | 4.5 | 2.4 | 2.6 | 2.4 | 2.5 | n/a |
|  |  | The other notes | | | | Metal pick off | Metal pick off | | | | | n/a |

TABLE 4B

|  |  |  |  | Ex 2a | Ex 2b | Ex 2c | Ex 2d | Ex 2e | Ex 2f | Ex 2g | Ex 2h | Ex 2i |
|---|---|---|---|---|---|---|---|---|---|---|---|---|
| Properties of Base film | CoF | A/B | μd | 0.55 | 0.64 | 0.68 | 0.39 | 0.81 | 0.42 | 0.41 | 0.79 | 0.87 |
|  |  |  | μs | 0.51 | 0.61 | 0.63 | 0.33 | 0.77 | 0.38 | 0.37 | 0.78 | 0.81 |
|  | Roughness | Skin A | SRa/nm | 30 | 32 | 32 | 43 | 32 | 32 | 55 | 32 | 32 |
|  |  |  | SRz/nm | 600 | 750 | 750 | 900 | 750 | 750 | 1600 | 750 | 750 |
|  |  | Skin B | SRa/nm | 65 | 55 | 58 | 55 | 48 | 67 | 55 | 57 | 37 |
|  |  |  | SRz/nm | 1400 | 1200 | 1250 | 1200 | 1050 | 1550 | 1200 | 1250 | 700 |
| Heat seal strength | Skin B/ Skin B | | g/in | 450 | 450 | 500 | 450 | 450 | 450 | 450 | 450 | 300 |
|  |  | | Initiation temp/° F. | 210 | 210 | 210 | 210 | 210 | 210 | 210 | 210 | 220 |
|  | Skin A/ Skin B | | g/in | 300 | 400 | 450 | 350 | 350 | 350 | 350 | 450 | 250 |
|  |  | | Initiation temp/° F. | 220 | 210 | 210 | 210 | 210 | 210 | 220 | 210 | 220 |
|  | Flatness (Level 5, 4, 3, 2, 1) | | | 5 | 3 | 2 | 4 | 4 | 4 | 5 | 3 | 5 |
|  | The other notes | | | | | | | Blocking | | Debris on rolls | Blocking | Blocking |
| Properties of MET film | Metal bond g/in | | | 420 | 400 | n/a | 420 | 410 | 400 | 400 | 410 | 410 |
|  | MVTR g/m²/day | | | 0.3 | 0.8 | n/a | 1.6 | 1.3 | 1.8 | 1.4 | 1.6 | 1.5 |
|  | O₂TR cc/m²/day | | | 1.7 | 4 | n/a | 4.7 | 4.3 | 4.7 | 4.5 | 4.5 | 4.3 |
|  | The other notes | | | | Metal pick off | n/a | Light spot | Metal pick off | Light spot | Light spot | Metal pick off | Metal pick off |

TABLE 4C

|  |  |  |  | Ex 3a | Ex 3b | Ex 3c | Ex 3d | Ex 4a | Ex 4b | Ex 5 |
|---|---|---|---|---|---|---|---|---|---|---|
| Properties of Base film | CoF | A/B | μd | 0.99 | 0.62 | 0.68 | 0.87 | 0.46 | 0.41 | 0.5 |
|  |  |  | μs | 0.93 | 0.57 | 0.65 | 0.83 | 0.42 | 0.38 | 0.45 |
|  | Roughness | Skin A | SRa/nm | 23 | 30 | 28 | 26 | 55 | 54 | 35 |
|  |  |  | SRz/nm | 400 | 600 | 530 | 470 | 1550 | 1300 | 800 |
|  |  | Skin B | SRa/nm | 55 | 57 | 53 | 54 | 55 | 56 | 50 |
|  |  |  | SRz/nm | 1200 | 1250 | 1150 | 1200 | 1200 | 1100 | 1100 |
| Heat seal strength | Skin B/ Skin B | | g/in | 450 | 450 | 450 | 450 | 400 | 400 | 400 |
|  |  | | Initiation temp/° F. | 210 | 210 | 210 | 210 | 220 | 220 | 220 |
|  | Skin A/ Skin B | | g/in | 350 | 300 | 350 | 400 | 300 | 300 | 300 |
|  |  | | Initiation temp/° F. | 210 | 220 | 210 | 210 | 220 | 220 | 220 |
|  | Flatness (Level 5, 4, 3, 2, 1) | | | 4 | 5 | 4 | 4 | 5 | 5 | 5 |
|  | The other notes | | | Blocking | | | Blocking | | | |
| Properties of MET film | Metal bond g/in | | | 400 | 410 | 400 | 410 | 400 | 400 | 350 |
|  | MVTR g/m²/day | | | 1.8 | 0.3 | 0.4 | 1.5 | 1.9 | 1.8 | 0.7 |
|  | O₂TR cc/m²/day | | | 4.9 | 2.1 | 2.4 | 4.2 | 4.9 | 5.1 | 4.1 |
|  | The other notes | | | Metal pick off | | | Metal pick off | Light spot | Light spot | no Cu seeding |

In conclusion, described are biaxially oriented polylactic acid polymer base films and metallized films with high metal adhesion, high barrier properties, and more particularly, with superior heat sealability. The films also have superior feasibility for the film making processes and the down stream converting processes with favorable properties and qualities such as heat resistance, handling and flatness for the food packaging industry.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed as new and desired to be protected by Letters Patent of the United States is:

1. A multilayer film comprising:
   a core layer comprising polylactic acid base polymer;
   a first skin layer consisting essentially of amorphous polylactic acid base polymer;
   a non-contiguous deposition anchorage layer comprising a cathode metal sputtered onto the first skin layer; and
   a metal layer on the non-contiguous deposition anchorage layer.

2. The multilayer film of claim 1, wherein the core layer comprises crystalline polylactic acid base polymer.

3. The multilayer film of claim 1, further comprising a second skin layer consisting essentially of amorphous polylactic acid base polymer.

4. The multilayer film of claim 1, wherein the first skin layer has a thickness of 2 μm or less.

5. The multilayer film of claim 3, wherein:
the core layer comprises crystalline polylactic acid base polymer;
the first skin layer has a thickness of 2 μm or less;
the second skin layer has a thickness of 2 μm or more; and
a total thickness of the first skin layer and the second skin layer/a thickness of crystalline core layer is ≤0.5.

6. The multilayer film of claim 3, wherein:
the first skin layer comprises 0.01 to 0.3 wt % particles of an average particle size of 0.1 to 3 μm; and
the second skin layer comprises 0.05 to 0.5 wt % particles of an average particle size of 1 to 5 μm.

7. The multilayer film of claim 6, wherein:
a thickness (t) and diameter (d) of the particles of both of the first skin layer and the second skin layer have the following relationship $$0.25 \leq t/d \leq 1.$$

8. The multilayer film of claim 6, wherein the particles in the first layer are aluminosilicate particles.

9. The multilayer film of claim 1, wherein the moisture vapor transmission rate (MVTR) of the film is 1.0 g/m2/day or less.

10. The multilayer film of claim 1, wherein the film is fin and lap sealable.

11. A biaxially oriented multilayer film comprising:
a core layer comprising polylactic acid base polymer;
a first skin layer consisting essentially of amorphous polylactic acid base polymer;
a non-contiguous deposition anchorage layer comprising a cathode metal sputtered onto the first skin layer; and
a metal layer on the non-contiguous deposition anchorage layer.

12. The biaxially oriented multilayer film of claim 11, wherein the core layer comprises crystalline polylactic acid base polymer.

13. The biaxially oriented multilayer film of claim 11, further comprising a second skin layer consisting essentially of amorphous polylactic acid base polymer.

14. The biaxially oriented multilayer film of claim 11, wherein the first skin layer has a thickness of 2 μm or less.

15. The biaxially oriented multilayer film of claim 13, wherein:
the core layer comprises crystalline polylactic acid base polymer;
the first skin layer has a thickness of 2 μm or less;
the second skin layer has a thickness of 2 μm or more; and
a total thickness of the first skin layer and the second skin layer/ a thickness of crystalline core layer is ≤0.5.

16. The biaxially oriented multilayer film of claim 13, wherein:
the first skin layer comprises 0.01 to 0.3 wt % particles of an average particle size of 0.1 to 3 μm; and
the second skin layer comprises 0.05 to 0.5 wt % particles of an average particle size of 1 to 5 μm.

17. The biaxially oriented multilayer film of claim 16, wherein:
a thickness (t) and diameter (d) of the particles of both of the first skin layer and the second skin layer have the following relationship $$0.25 \leq t/d \leq 1.$$

18. The biaxially oriented multilayer film of claim 16, wherein the particles in the first layer are aluminosilicate particles.

19. The biaxially oriented multilayer film of claim 15, wherein the moisture vapor transmission rate (MVTR) of the film is 1.0 g/m2/day or less.

20. The biaxially oriented multilayer film of claim 11, wherein the film is fin and lap sealable.

* * * * *